(12) United States Patent
Kordik et al.

(10) Patent No.: US 10,974,709 B2
(45) Date of Patent: Apr. 13, 2021

(54) BI-STABLE HYDRAULIC CONTROL VALVE SYSTEM

(71) Applicant: GOODRICH CORPORATION, Charlotte, NC (US)

(72) Inventors: Michael Kordik, Dayton, OH (US); Clifton Randy Boggs, Springfield, OH (US)

(73) Assignee: Goodrich Corporation, Charlotte, NC (US)

( * ) Notice: Subject to any disclaimer, the term of this patent is extended or adjusted under 35 U.S.C. 154(b) by 80 days.

(21) Appl. No.: 16/359,883

(22) Filed: Mar. 20, 2019

(65) Prior Publication Data
US 2020/0298814 A1    Sep. 24, 2020

(51) Int. Cl.
| | |
|---|---|
| *B60T 15/02* | (2006.01) |
| *B60T 8/17* | (2006.01) |
| *B60T 15/04* | (2006.01) |
| *B64C 25/34* | (2006.01) |
| *B64C 25/42* | (2006.01) |
| *B64C 25/44* | (2006.01) |

(Continued)

(52) U.S. Cl.
CPC .......... *B60T 15/025* (2013.01); *B60T 8/1703* (2013.01); *B60T 15/041* (2013.01); *B64C 25/34* (2013.01); *B64C 25/426* (2013.01); *B64C 25/44* (2013.01); *B64C 25/62* (2013.01); *F16K 31/003* (2013.01)

(58) Field of Classification Search
CPC .... B60T 8/1703; B60T 8/3665; B60T 15/025; B60T 15/041; B64C 25/34; B64C 25/426; B64C 25/44; B64C 25/62; F16K 31/003; F16K 31/08; F16K 31/082

USPC .......................................................... 251/65
See application file for complete search history.

(56) References Cited

U.S. PATENT DOCUMENTS

| | | | |
|---|---|---|---|
| 5,129,115 A | 7/1992 | Higgins et al. | |
| 5,249,603 A | 10/1993 | Byers, Jr. | |

(Continued)

FOREIGN PATENT DOCUMENTS

| | | |
|---|---|---|
| DE | 1415068 | 11/1995 |
| DE | 10044486 | 4/2001 |

(Continued)

OTHER PUBLICATIONS

European Patent Office, European Search Report dated Jul. 8, 2020 in Application No. 19216270.9.

(Continued)

*Primary Examiner* — Thomas W Irvin
(74) *Attorney, Agent, or Firm* — Snell & Wilmer L.L.P.

(57) ABSTRACT

Systems and methods for a bi-stable valve are provided. The bi-stable valve may comprise a housing including an input port, a first output port, and a second output port, a spool disposed within the housing and configured to translate in response to a first magnetic force, wherein the spool is further configured to selectively enable fluid communication between the input port and each of the first output port and the second output port in response to translating the spool between a first position and a second position, a spring disposed within the housing and coupled to the spool, an electromagnet coupled to the housing and configured to apply the first magnetic force to the spool, and a permanent magnet configured to apply a second magnetic force to the spool.

19 Claims, 5 Drawing Sheets

(51) Int. Cl.
*B64C 25/62* (2006.01)
*F16K 31/00* (2006.01)

(56) References Cited

U.S. PATENT DOCUMENTS

| | | | | |
|---|---|---|---|---|
| 5,611,370 | A * | 3/1997 | Najmolhoda | F16K 31/0613 137/625.61 |
| 5,996,628 | A * | 12/1999 | Najmolhoda | F16K 31/0613 137/625.61 |
| 6,247,765 | B1 * | 6/2001 | Oyama | B60T 8/3665 303/119.2 |
| 6,357,480 | B1 * | 3/2002 | Oyama | B60T 8/3665 137/625.65 |
| 6,685,280 | B1 * | 2/2004 | Yoshino | B60T 7/04 303/119.2 |
| 8,579,250 | B1 | 11/2013 | Theobald | |
| 8,746,280 | B2 * | 6/2014 | Hoffmann | F16K 31/082 137/625.48 |
| 9,046,188 | B2 | 6/2015 | Frippiat et al. | |
| 10,024,453 | B2 * | 7/2018 | Robertson | F16K 31/0655 |
| 10,190,699 | B2 | 1/2019 | Ulbricht et al. | |
| 10,400,909 | B2 * | 9/2019 | Mott | F01L 13/00 |
| 2002/0079005 | A1 | 6/2002 | Yoshida et al. | |
| 2006/0071547 | A1 * | 4/2006 | Holder | B60T 8/3695 303/117.1 |
| 2008/0099069 | A1 * | 5/2008 | Cook | F16K 31/02 137/14 |
| 2010/0252114 | A1 * | 10/2010 | Hoffmann | F15B 13/044 137/1 |
| 2018/0208168 | A1 | 7/2018 | Ayichew et al. | |
| 2019/0120401 | A1 * | 4/2019 | Mott | F01L 13/00 |

FOREIGN PATENT DOCUMENTS

| | | |
|---|---|---|
| DE | 102007057882 | 6/2009 |
| EP | 1857720 | 11/2007 |
| JP | 2010151264 | 7/2010 |

OTHER PUBLICATIONS

European Patent Office, European Search Report dated Oct. 16, 2020 in Application No. 19216270.9.

\* cited by examiner

BI-STABLE HYDRAULIC CONTROL VALVE SYSTEM

FIELD

The present disclosure relates generally to valves, and, more specifically, to bi-stable hydraulic, pneumatic, or other systems and methods for bi-stable valve control for aircraft brake systems.

BACKGROUND

Aircraft often include one or more landing gear that comprise one or more wheels. Wheels may comprise friction brakes which may be hydraulically operated to park the aircraft when not in operation, for example, by way of a parking valve. Some valves provide proportional hydraulic pressure based on proportional control signal. Other valves provide simple open/closed functionality. For these valves it is sometimes desirable to hold the open/closed state while the system is unpowered. Typically these valves use a solenoid to stay powered to hold the hydraulic in the open/closed state.

SUMMARY

In various embodiments, a bi-stable valve is provided comprising a housing including an input port, a first output port, and a second output port, a spool disposed within the housing and configured to translate in response to a first magnetic force, wherein the spool is further configured to selectively enable fluid communication between the input port and each of the first output port and the second output port in response to translating the spool between a first position and a second position, a spring disposed within the housing and coupled to the spool, an electromagnet coupled to the housing and configured to apply the first magnetic force to the spool, and a permanent magnet configured to apply a second magnetic force to the spool.

In various embodiments, the spring is configured to apply a spring force to the spool and, in response, maintain the spool in the first position enabling the fluid communication between the input port and the first output port. In various embodiments, in response to compressing the spring and translating the spool from the first position to the second position enabling the fluid communication between the input port and the second output port, the second magnetic force is configured to overcome the spring force and maintain the spool in the second position. In various embodiments, the spool comprises an axial passage. In various embodiments, the spool comprises at least one of a ferromagnetic, ferrimagnetic, paramagnetic, diamagnetic, or magnetic insert. In various embodiments, the spring comprises a coil spring. In various embodiments, the spool is sealed against an interior surface of the housing by a sealing member. In various embodiments, the spring comprises a coil spring.

In various embodiments, a system is provided comprising an aircraft having a landing gear comprising a wheel, a friction brake having coupled to the wheel, a bi-stable valve configured to set a parking brake condition of the friction brake, comprising a housing including an input port, a first output port, and a second output port, a spool disposed within the housing and configured to translate in response to a first magnetic force, wherein the spool is further configured to selectively enable fluid communication between the input port and each of the first output port and the second output port in response to translating the spool between a first position and a second position, a spring disposed within the housing and coupled to the spool, an electromagnet coupled to the housing and configured to apply the first magnetic force to the spool, and a permanent magnet configured to apply a second magnetic force to the spool.

In various embodiments, the spring is configured to apply a spring force to the spool and, in response, maintain the spool in the first position enabling the fluid communication between the input port and the first output port. In various embodiments, in response to compressing the spring and translating the spool from the first position to the second position enabling the fluid communication between the input port and the second output port, the second magnetic force is configured to overcome the spring force and maintain the spool in the second position. In various embodiments, the spool comprises an axial passage. In various embodiments, the spool comprises at least one of a ferromagnetic, ferrimagnetic, paramagnetic, diamagnetic, or magnetic insert. In various embodiments, the spring comprises a coil spring. In various embodiments, the spool is sealed against an interior surface of the housing by a sealing member.

In various embodiments, the system further comprises a tangible, non-transitory memory configured to communicate with a controller, the tangible, non-transitory memory having instructions stored thereon that, in response to execution by the controller, cause the controller to perform operations comprising receiving a command signal, controlling the electromagnet to apply the first magnetic force in response to the command signal, receiving a current feedback from the electromagnet, and determining whether the spool has transitioned from the first position to the second position based on the current feedback and a current feedback response model. In various embodiments, the operations further comprise determining a point of no return for the spool based on the current feedback and the current feedback response model, and modulating the first magnetic force in response to the point of no return such that the vector sum of the first magnetic force, the second magnetic force, and the spring force is less than a soft close threshold. In various embodiments, the controller is configured to receive the command signals via RF link. In various embodiments, the system further comprises an aircraft handler's control panel proximate the landing gear and in electronic communication with the bi-stable control valve.

In various embodiments an article of manufacture is provided including a tangible, non-transitory memory configured to communicate with a controller, the tangible, non-transitory memory having instructions stored thereon that, in response to execution by the controller, cause the controller to perform operations comprising receiving a command signal, controlling an electromagnet to apply a first magnetic force in response to the command signal, receiving a current feedback from the electromagnet, and determining whether a spool has transitioned from a first position to a second position based on the current feedback and a current feedback response model. In various embodiments, the operations further comprise determining a point of no return for the spool based on the current feedback and the current feedback response model, and modulating the first magnetic force in response to the point of no return such that a vector sum of the first magnetic force, a second magnetic force, and a spring force is less than a soft close threshold.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). As used herein, "transmit" may include sending electronic data from one system component to another via electronic communication between the components. Additionally, as used herein, "electronic data" may include encompassing information such as commands, queries, files, data for storage, and the like in digital or any other form.

Figure 1:
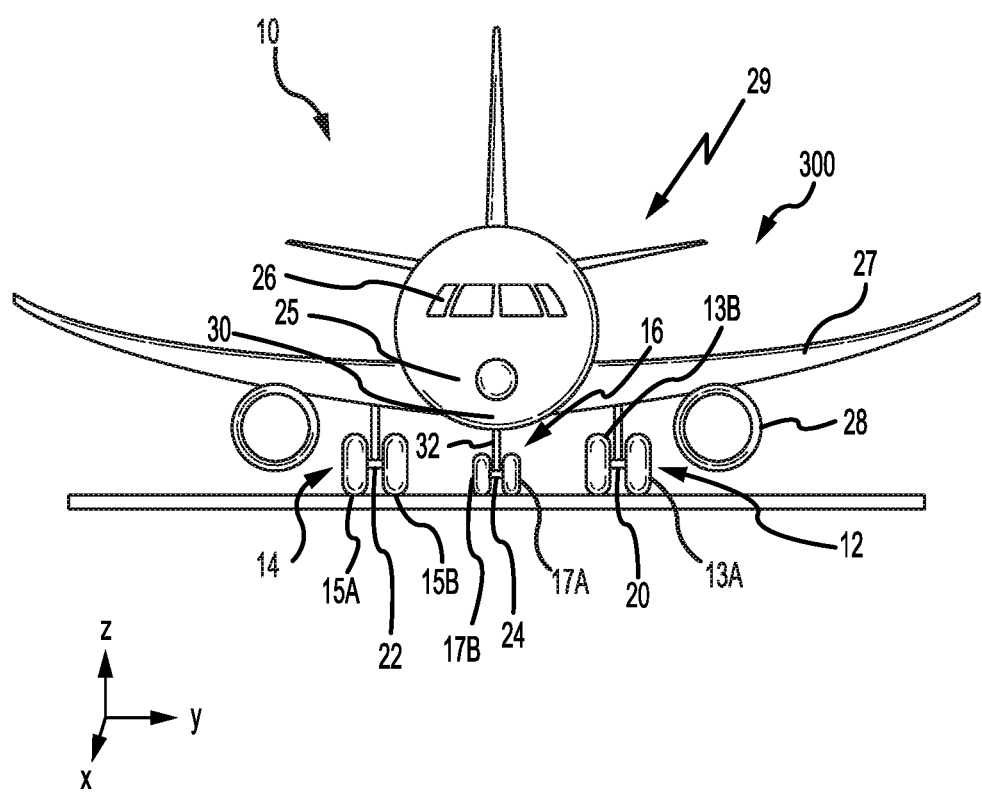
FIG. 1 illustrates an aircraft, in accordance with various embodiments.

With reference to FIG. 1, an aircraft 10 in accordance with various embodiments may comprise aircraft systems, for example, landing gear such as landing gear 12, landing gear 14 and landing gear 16. Landing gear 12, landing gear 14 and landing gear 16 may generally support aircraft 10 when aircraft is not flying, allowing aircraft 10 to taxi, take off, and land without damage and may comprise an electronic taxi system. Landing gear 12 may include wheel 13A, comprising a friction brake, and wheel 13B comprising a friction brake, coupled by an axle 20. Landing gear 14 may include wheel 15A comprising a friction brake, and wheel 15B comprising a friction brake, coupled by an axle 22. Landing gear 16 may include nose wheel 17A comprising a friction brake, and nose wheel 17B comprising a friction brake, coupled by an axle 24. Any of the friction brakes may be hydraulically operated and may include a proportional control valve to facilitate modulation of brake pressure (i.e., provide a proportional hydraulic pressure to actuate the friction brake) and/or a bi-stable valve to set a parking brake condition of the friction brakes.

Aircraft 10 may comprise Brake Control Unit (BCU) 25, cockpit controls 26, aerodynamic surfaces 27, and propulsion system 28. Landing gear 14, landing gear 16, and landing gear 12 may be in communication with BCU 25 and may receive commands from BCU 25, for example, to apply friction brakes. In various embodiments, the BCU is typically located in the fuselage of the aircraft. Wires may extend between the fuselage and the BCU at the location of the wheels. Electric signals may be sent and received between the friction brake and the BCU. The BCU may receive signals or commands from a pilot, from sources external to the aircraft, or from any other suitable onboard sensors known to those skilled in the art. In various embodiments, BCU 25 may be in electronic communication with cockpit controls 26, ground controls 30 (such as an aircraft handler's control panel 32), and/or may be in electronic communication with external systems via external command signals 29 such as, for example, an aircraft tug operator. The BCU 25 may apply the friction brakes in response to the pilot cockpit controls 26, ground controls 30, or external command signals 29. In various embodiments, the BCU may command a bi-stable valve 300 to set a parking brake condition of the friction brakes. The BCU 25 may receive sensor feedback from the bi-stable valve 300 such as, for example, position feedback, electrical feedback, and/or any other suitable input data. The BCU 25 may control the bi-stable valve 300 in response to the feedback.

Figure 2:
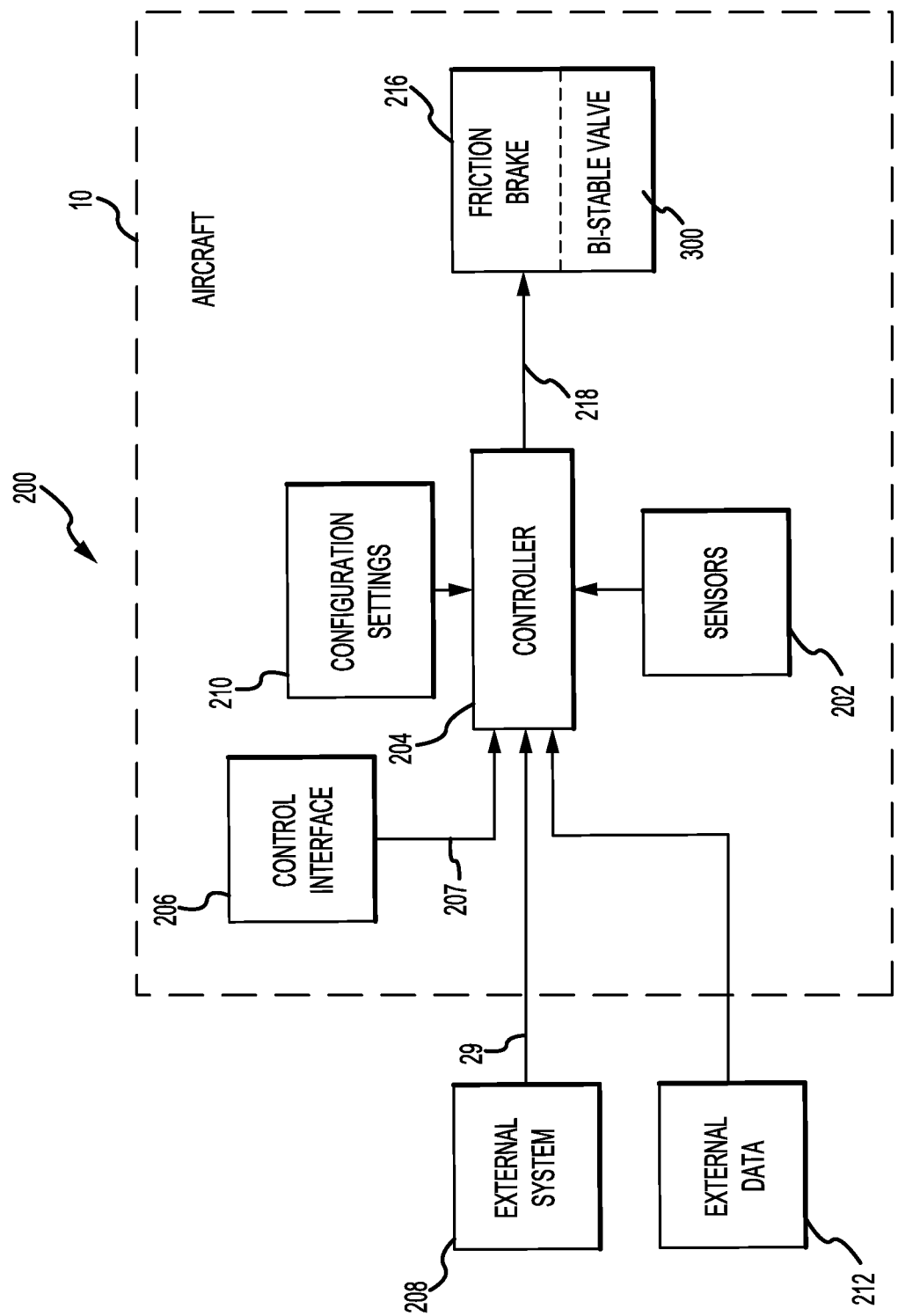
FIG. 2 illustrates a block diagram for a system for bi-stable valve control, in accordance with various embodiments.

In various embodiments, and with reference to FIGS. 1 and 2, a system 200 for bi-stable valve control may comprise one or more feedback elements to monitor and measure aircraft 10 characteristics. For example, sensors 202 may be coupled to or in direct electronic communication with aircraft systems such as, for example, landing gear 14 comprising a friction brake 216 or, for example, propulsion system. Sensors 202 may comprise a temperature sensor, a torque sensor, a speed sensor, a pressure sensor, a position sensor, an accelerometer, a voltmeter, an ammeter, a wattmeter, or any other suitable measuring device known to those skilled in the art. Sensors 202 may be configured to measure a characteristic of an aircraft system or component. Sensors 202 may be configured to measure, for example, a landing gear wheel speed, a friction brake pressure, an aircraft airspeed, or a weight-on-wheels (WOW) condition.

Sensors 202 may be configured to transmit the measurements to controller 204, thereby providing sensor feedback about the aircraft system to controller 204. The sensor feedback may be, for example, a speed signal, or may be position feedback, temperature feedback, pressure feedback or other data.

In various embodiments, controller 204 may be in electronic communication with a pilot through a control interface 206 of cockpit controls 26, for example, a switch, a pedal or set of pedals, that a pilot can operate. The control interface 206 may output a measure of, for example, pedal deflection or switch position, and such output may be used as command signals 207. In various embodiments, controller 204 may be in electronic communication with an external system 208 through external command signals 29. In various embodiments, the information or instruction issued by the pilot or the external system via the command signals is of the form of "set brake" or "disengage brake." In various embodiments, external command signals 29 may include, commands generated from an aircraft handler's control panel 32 located proximate the landing gear 16. In various embodiments, the external command signals may be generated remotely and transmitted via radio to the aircraft 10 and controller 204. In various embodiments, controller 204 may be in electronic communication with configuration settings 210 or library values used by a bi-stable brake valve control algorithm or other algorithm. In various embodiments, controller 204 may be in electronic communication with external data 212 sources which may be used by an algorithm.

In various embodiments, controller 204 may be integrated into computer systems onboard an aircraft, such as, for example, BCU 25. In various embodiments, controller 204 may comprise a processor. In various embodiments, controller 204 may be implemented in a single processor. In various embodiments, controller 204 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 204 may comprise a processor configured to implement various logical operations in response to execution of instructions, for example, instructions stored on a non-transitory, tangible, computer-readable medium configured to communicate with controller 204.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 3A:
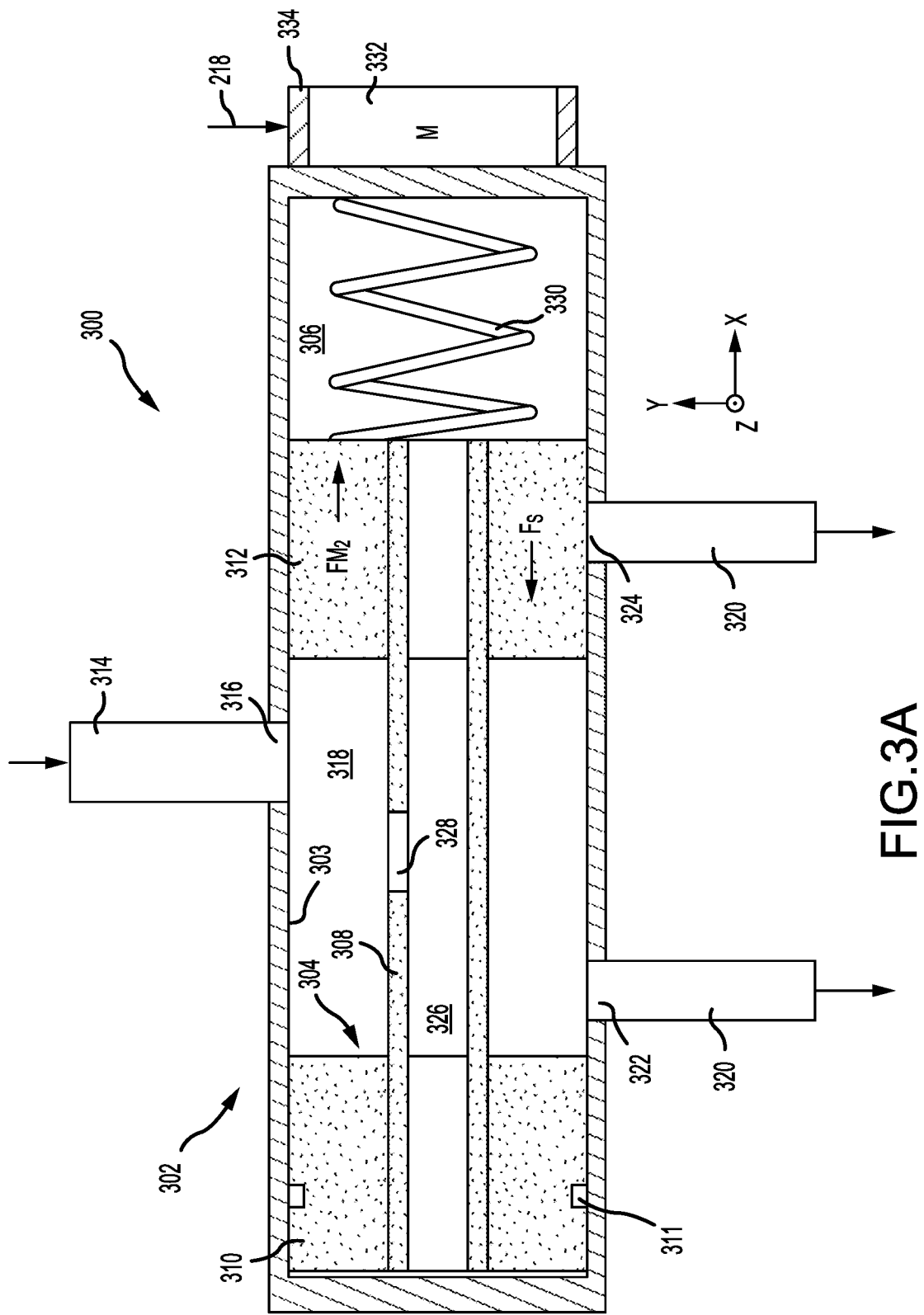
FIG. 3A illustrates a bi-stable valve in a first position, in accordance with various embodiments.
Figure 3B:
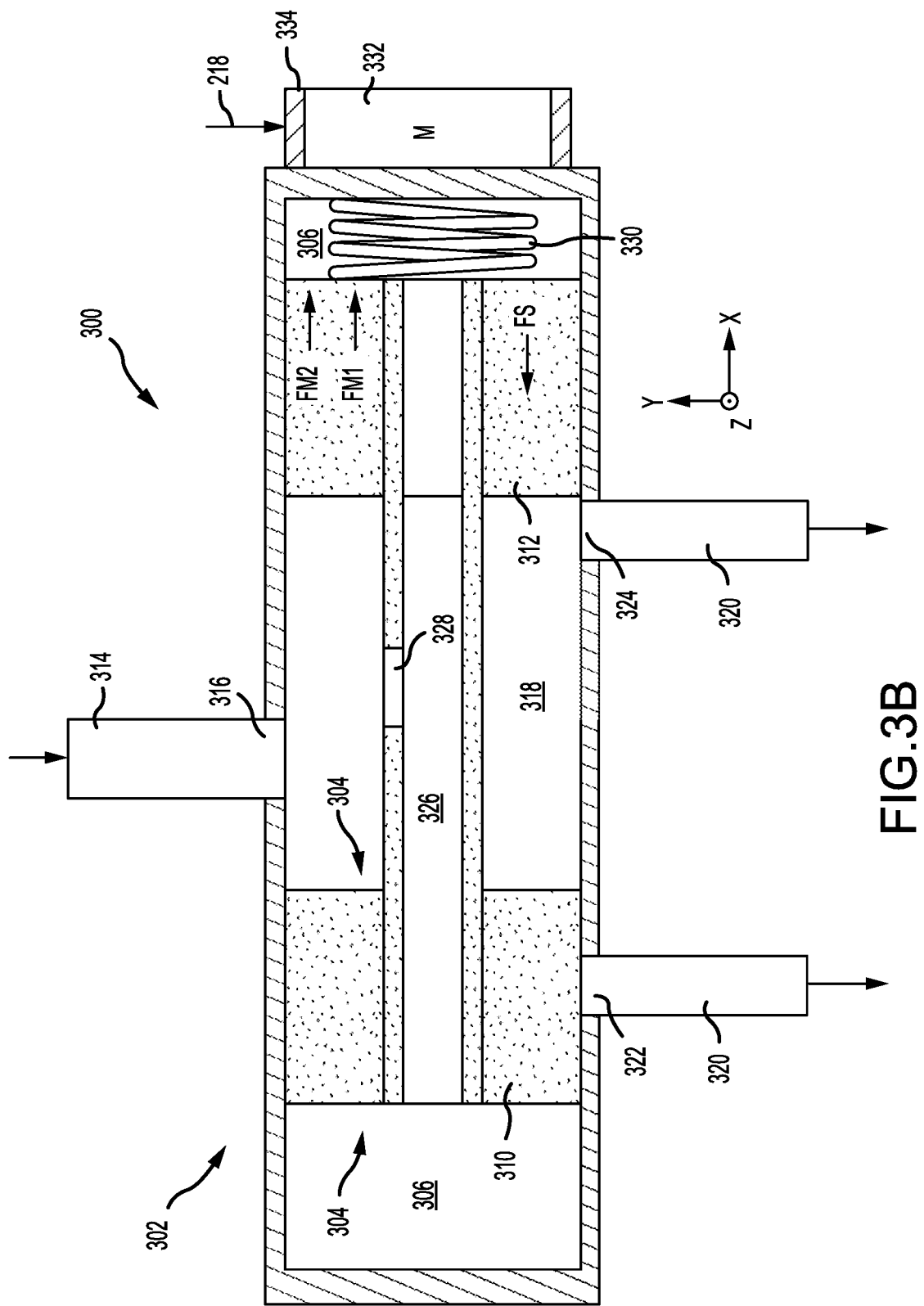
FIG. 3B illustrates a bi-stable valve in a second position, in accordance with various embodiments.

In various embodiments, and with additional reference to FIGS. 3A and 3B, friction bakes 216 and bi-stable valve 300 may be in electronic communication with and may be configured to receive electronic data from or be controlled via controller 204. FIG. 3A illustrates a cross section of bi-stable valve 300 in a first position and FIG. 3B illustrates a cross section of bi-stable valve 300 in a second position. Bi-stable valve 300 comprises a housing 302 containing a translating member, such as a spool 304, configured to translate axially (along the X-axis) within an interior volume 306 of the housing 302. The spool 304 comprises a center portion 308 extending between a first end portion 310 and a second end portion 312. The center portion 308 has a relatively reduced diameter in comparison to the first end portion 310 and the second end portion 312.

In various embodiments, the housing 302 may comprise a generally cylindrical structure extending axially along the X-axis and radially along the Y-axis. An inlet fitting 314 may extend radially proximate a midpoint of the housing 302 and open via inlet port 316 to a chamber 318 defined by the reduced diameter of the center portion 308 of the spool 304. A pair of outlet fittings 320 extend radially from the housing 302 and are selectably open to chamber 318 via a first outlet port 322 and a second outlet port 324. As the spool 304 translates toward the negative X-direction within the housing 302, the second end portion 312 blocks the second outlet port 324 and the first end portion 310 is driven away from the first outlet port 322 as shown in FIG. 3A thereby enabling fluid communication between the inlet port 316 and the first outlet port 322. As the spool 304 translates toward the positive X-direction within the housing 302, the second end portion 312 moves to open the second outlet port 324 and the first end portion 310 blocks the first outlet port 322 thereby enabling fluid communication between the inlet port 316 and the second outlet port 324 as shown in FIG. 3B.

In various embodiments, the end portions 310 and 312 of the spool 304 may be sealed against the interior surface 303 of the housing 302 such as, for example, by a tight tolerance and/or a seal member 311 such as an sealing ring. The spool 304 may comprise a magnetic material such as, for example, a ferromagnetic, ferrimagnetic, paramagnetic, diamagnetic material. In various embodiments, the spool 304 may comprise a non-magnetic material coupled to a magnetic material and/or encapsulating a magnetic material such as, for example, a magnetic insert within the first end portion 310 and the second end portion 312. In various embodiments, the center portion 308 of the spool 304 defines an axial passage 326 (along the X-axis) in fluid communication between the chamber 318 and the interior volume 306 of the housing 302 via an aperture 328. In this regard, a fluid pressure within the interior volume 306 of the housing 302 may be balanced as the spool 304 translates between the first position and the second position.

In various embodiments, a spring 330 such as, for example, a coil spring may be disposed within the housing 302. The spring 330 may be coupled between the housing 302 and the second end portion 312. The spring 330 imparts a spring force $F_S$ on the spool 304 thereby retaining the spool 304 in the first position. A permanent magnet 332 may be coupled to the housing 302. The permanent magnet 332 may be encircled by windings of an electromagnet 334 which may receive a control signals 218 (e.g., a control current) from the controller 204. In response to the control signals 218 current may flow through the electromagnet generating a first magnetic force $F_{M1}$ acting on the spool 304. The first magnetic force $F_{M1}$ may tend to attract the spool 304 relatively toward the permanent magnet 332 and the electromagnet 334. In response, the spool 304 may transition from the first position to the second position thereby compressing the spring 330. In response to transitioning the spool 304 from the first position to the second position, controller 204 may remove the current from the electromagnet 334 thereby disrupting the first magnetic force $F_{M1}$. In various embodiments, the permanent magnet 332 may apply a second magnetic force $F_{M2}$ in response to disruption of the first magnetic force $F_{M1}$. With spool 304 in the second position the second magnetic force $F_{M2}$ may exceed the spring force $F_S$ and thereby tend to retain the spool 304 in the second position. In this regard, the spool 304 may be maintained in either of the first position or the second position in absence of current flow to the electromagnet 334. In various embodiments, the controller 204 may reverse the control current and thereby apply the first magnetic force to drive the spool 304 relatively away from the permanent magnet 332 and transition the spool 304 from the second position to the first position. Stated another way, the vector sum of the first magnetic force $F_{M1}$, the second magnetic force $F_{M2}$, and the spring force $F_S$ may be selectively controlled by controller 204 (i.e., by modulating the first magnetic force $F_{M1}$) to be directed along the negative or positive X-axis and thereby transition the spool 304 between the first position or the second position.

Figure 4:
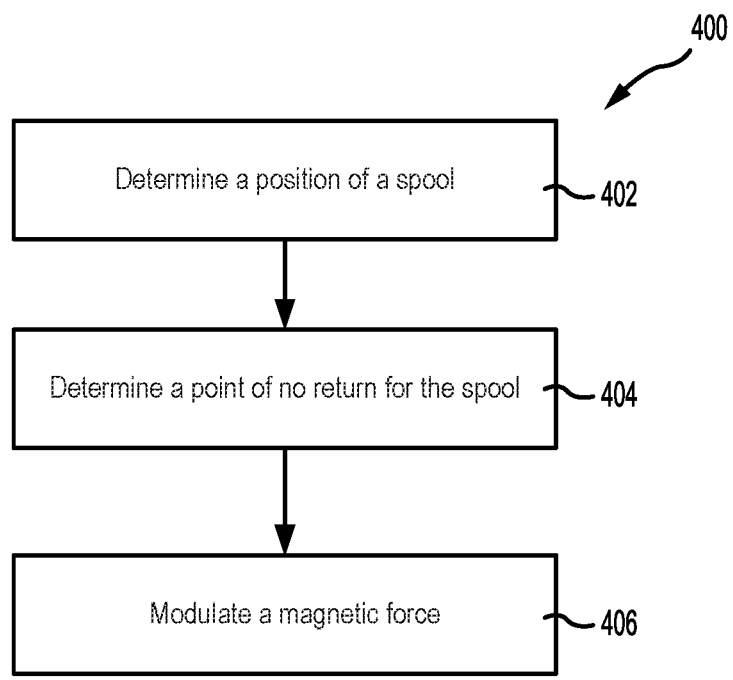
FIG. 4 illustrates a control algorithm for a bi-stable valve, in accordance with various embodiments.

In various embodiments and with additional reference to FIG. 4 a control algorithm 400 for a bi-stable valve is illustrated. Controller 204 may receive feedback data such as current feedback from the electromagnet 334. Controller 204 may determine a position of the spool 304 based on the current feedback (step 402). Controller 204 may compare the current feedback with a first current feedback response associated with the first position of the spool 304 and a second current feedback response associated with the second position of the spool 304. The controller 204 may determine the spool in the first position, the second position, or an intermediate position based on a current feedback response model. The controller 204 may determine the position in response to controlling the spool 304 between the first position and the second position. For example, the controller may determine a point of no return for the spool 304 (step 404), i.e. a point along the traverse of spool 304 where the second magnetic force $F_{M2}$ has exceeded the spring force $F_S$. In various embodiments and in response to determining the point of no return, controller 204 may reverse the current flow in the electromagnet 334 and thereby cause the first magnetic force $F_{M1}$ to offset the spring force $F_S$. Controller 204 may modulate the current flow (and thereby the first magnetic force $F_{M1}$) such that the vector sum of the spring force FS, the first magnetic force $F_{M1}$ and the second magnetic force FM2 remains below a threshold force, e.g., a soft close threshold force (step 406). In this regard, controller 204 may control a closure force of the bi-stable valve tending thereby to reduce housing 302 and spool 304 stresses.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A bi-stable valve, comprising:
a housing including an input port, a first output port, and a second output port;
a spool disposed within the housing and configured to translate in response to a first magnetic force,
wherein the spool is further configured to selectively enable fluid communication between the input port and each of the first output port and the second output port in response to translating the spool between a first position and a second position;
a spring disposed within the housing and coupled to the spool;
an electromagnet coupled to the housing and configured to apply the first magnetic force to the spool;
a permanent magnet configured to apply a second magnetic force to the spool; and
a tangible, non-transitory memory configured to communicate with a controller, the tangible, non-transitory memory having instructions stored thereon that, in response to execution by the controller, cause the controller to perform operations comprising:
receiving, by the controller, a command signal;
controlling, by the controller, an electromagnet to apply a first magnetic force to a spool in response to the command signal;
receiving, by the controller, a current feedback from the electromagnet determining, by the controller, whether the spool has transitioned from a first position to a second position based on the current feedback and a current feedback response model;

determining, by the controller, a point of no return for the spool based on the current feedback and the current feedback response model; and modulating, by the controller, the first magnetic force in response to the point of no return such that a vector sum of the first magnetic force, a second magnetic force, and a spring force is less than a soft close threshold.

2. The bi-stable valve of claim 1, wherein the spring is configured to apply a spring force to the spool and, in response, maintain the spool in the first position enabling the fluid communication between the input port and the first output port.

3. The bi-stable valve of claim 2, wherein, in response to compressing the spring and translating the spool from the first position to the second position enabling the fluid communication between the input port and the second output port, the second magnetic force is configured to overcome the spring force and maintain the spool in the second position.

4. The bi-stable valve of claim 1, wherein the spool comprises an axial passage.

5. The bi-stable valve of claim 1, wherein the spool comprises at least one of a ferromagnetic, ferrimagnetic, paramagnetic, diamagnetic, or magnetic insert.

6. The bi-stable valve of claim 1, wherein the spool is sealed against an interior surface of the housing by sealing member.

7. The bi-stable valve of claim 1, wherein the spring is a coil spring.

8. A system, comprising:
an aircraft having a landing gear comprising a wheel;
a friction brake having coupled to the wheel;
a bi-stable valve configured to set a parking brake condition of the friction brake, comprising:
a housing including an input port, a first output port, and a second output port;
a spool disposed within the housing and configured to translate in response to a first magnetic force,
wherein the spool is further configured to selectively enable fluid communication between the input port and each of the first output port and the second output port in response to translating the spool between a first position and a second position;
a spring disposed within the housing and coupled to the spool;
an electromagnet coupled to the housing and configured to apply the first magnetic force to the spool; and
a permanent magnet configured to apply a second magnetic force to the spool.

9. The system of claim 8, wherein the spring is configured to apply a spring force to the spool and, in response, maintain the spool in the first position enabling the fluid communication between the input port and the first output port.

10. The system of claim 8, wherein, in response to compressing the spring and translating the spool from the first position to the second position enabling the fluid communication between the input port and the second output port, the second magnetic force is configured to overcome a spring force and maintain the spool in the second position.

11. The system of claim 8, wherein the spool comprises an axial passage.

12. The system of claim 8, wherein the spool comprises at least one of a ferromagnetic, ferrimagnetic, paramagnetic, diamagnetic, or magnetic insert.

13. The system of claim 8, further comprising a tangible, non-transitory memory configured to communicate with a controller, the tangible, non-transitory memory having instructions stored thereon that, in response to execution by the controller, cause the controller to perform operations comprising:
receiving, by the controller, a command signal;
controlling, by the controller, the electromagnet to apply the first magnetic force in response to the command signal;
receiving, by the controller, a current feedback from the electromagnet; and
determining, by the controller, whether the spool has transitioned from the first position to the second position based on the current feedback and a current feedback response model.

14. The system of claim 13, wherein the operations further comprise:
determining, by the controller, a point of no return for the spool based on the current feedback and the current feedback response model;
modulating, by the controller, the first magnetic force in response to the point of no return such that a vector sum of the first magnetic force, the second magnetic force, and a spring force is less than a soft close threshold.

15. The system of claim 13, wherein the controller is configured to receive the command signals via RF link.

16. The system of claim 8, further comprising an aircraft handler's control panel proximate the landing gear and in electronic communication with the bi-stable control valve.

17. The system of claim 8, wherein the spool is sealed against an interior surface of the housing by a sealing member.

18. The system of claim 8, wherein the spring comprises a coil spring.

19. An article of manufacture comprising a tangible, non-transitory memory configured to communicate with a controller, the tangible, non-transitory memory having instructions stored thereon that, in response to execution by the controller, cause the controller to perform operations comprising:
receiving, by the controller, a command signal;
controlling, by the controller, an electromagnet to apply a first magnetic force to a spool in response to the command signal;
receiving, by the controller, a current feedback from the electromagnet;
determining, by the controller, whether the spool has transitioned from a first position to a second position based on the current feedback and a current feedback response model;
determining, by the controller, a point of no return for the spool based on the current feedback and the current feedback response model; and
modulating, by the controller, the first magnetic force in response to the point of no return such that a vector sum of the first magnetic force, a second magnetic force, and a spring force is less than a soft close threshold.

* * * * *